United States Patent [19]

Greiner

[11] Patent Number: 6,156,448
[45] Date of Patent: Dec. 5, 2000

[54] HIGH TEMPERATURE FUEL CELL AND HIGH TEMPERATURE FUEL CELL STACK

[75] Inventor: Horst Greiner, Forchheim, Germany

[73] Assignee: Siemens Aktiengesellschaft, Munich, Germany

[21] Appl. No.: 09/133,002

[22] Filed: Aug. 12, 1998

Related U.S. Application Data

[63] Continuation of application No. PCT/DE97/00183, Jan. 30, 1997.

[30] Foreign Application Priority Data

Feb. 12, 1996 [DE] Germany ................. 196 05 086

[51] Int. Cl.[7] .......................... H01M 8/02; H01M 8/12
[52] U.S. Cl. ................................. 429/33; 429/34
[58] Field of Search ........................ 429/30, 32, 33, 429/34, 38, 39

[56] References Cited

U.S. PATENT DOCUMENTS 5,518,829  5/1996  Satake et al. .

FOREIGN PATENT DOCUMENTS

| 0414270A2 | 2/1991 | European Pat. Off. . |
| 0670606A1 | 9/1995 | European Pat. Off. . |
| 6-76842 | 3/1994 | Japan . |
| 7145454 | 6/1995 | Japan . |
| 7166301 | 6/1995 | Japan . |

OTHER PUBLICATIONS

"Ceramic and Metallic Components for a Planar SOFC", Ivers–Tiffee et al., 250a Berichte der Bunsengesellschaft für Physikalische Chemie, 94 (1990), Sep., No. 9, Wewinheim, Germany, pp. 978–981.

"Fuel Cell Handbook", A.J. Appleby et al., 1989, pp. 442–454 No Month Available.

"Brennstoffzellen als Energiewandler", Wolfgang Drenckhahn et al., Energiewirtschaftliche Tagesfragen, Jun. 1993, vol. 6, pp. 382–390.

*Primary Examiner*—Maria Nuzzolillo
*Assistant Examiner*—Susy Tsang
*Attorney, Agent, or Firm*—Herbert L. Lerner; Laurence A. Greenberg; Werner H. Stemer

[57] ABSTRACT

A high temperature fuel cell stack is composed of high temperature fuel cells having interconnecting conducting plates for leading off current produced in the high temperature fuel cell. At least one of the plates is formed of an alloy based on Fe with a Cr content of between 17 and 30% by weight and has an average coefficient of thermal expansion of between 13 and $14 \times 10^{-6}$/K in a temperature range from room temperature to 900° C. Two electrodes are disposed between the plates and supplied with a working medium by the plates. One of the electrodes has a thickness of at least 100 $\mu$m and the other a thickness of about 30 $\mu$m. An electrolyte is disposed between the two electrodes, contains stabilized $ZrO_2$ and has a thickness of between 5 and 30 $\mu$m. The electrodes and the electrolyte have a coefficient of thermal expansion matched to that of the at least one plate. The material costs for the plates are reduced by a factor of 10 to 20 in comparison with prior art plates.

5 Claims, 2 Drawing Sheets

HIGH TEMPERATURE FUEL CELL AND HIGH TEMPERATURE FUEL CELL STACK

CROSS-REFERENCE TO RELATED APPLICATION

This application is a continuation of copending International Application No. PCT/DE97/00183, filed Jan. 30, 1997, which designated the United States.

BACKGROUND OF THE INVENTION

Field of the Invention

The invention relates to a high temperature fuel cell and to a high temperature fuel cell stack.

In a fuel cell stack formed of high temperature fuel cells, a contact layer, an electrolyte/electrode element, a further interconnecting conducting plate, etc. are disposed in that order on one another and below an upper interconnecting conducting plate which covers the high temperature fuel cell stack. A fuel cell stack is also abbreviated as a "stack" in the specialist literature. The electrolyte/electrode element in that case includes two electrodes and an electrolyte which is disposed between the two electrodes. The interconnecting conducting plates within the high temperature fuel cell stack in that case are constructed as bipolar plates. In contrast to an interconnecting conducting plate disposed at an edge of the high temperature fuel cell stack, those plates are provided on both sides with channels for supplying the electrolyte/electrode elements with a respective working medium.

In that case, each electrolyte/electrode element lying between two neighboring interconnecting conducting plates, including the contact layer directly adjoining the electrolyte/electrode element on both sides, and those sides of each of the two interconnecting conducting plates which adjoin the contact layer, together form a high temperature fuel cell.

That and other types of fuel cells are, for example, disclosed in a book entitled "Fuel Cell Handbook" by A. J. Appelby and F. R. Foulkes, 1989, pages 442 to 454, or an article entitled "Brennstoffzellen als Energiewandler" [Fuel Cells as Energy Converters], in Energiewirtschaftliche Tagesfragen, June 1993, Vol. 6, pages 382 to 390. As a rule, a high temperature fuel cell stack is composed of a large number of high temperature fuel cells. Accordingly, a large number of electrolyte/electrode elements must be connected with interconnecting conducting plates in a gas-tight manner, that is to say, in other words, integrally. The interconnecting conducting plates within the high temperature fuel cell stack, that is to say the bipolar plates, thus serve the purpose of connecting the electrolyte/electrode elements electrically in series with one another, and of supplying the electrodes of the electrolyte/electrode elements with working media. The interconnecting conducting plates for closing off the high temperature fuel cell stack differ from the bipolar plates in two ways. Those interconnecting conducting plates are provided only on one side with channels for supplying the electrolyte/electrode elements with working media, and the current produced in the high temperature fuel cells is led off from the high temperature fuel cell stack through those interconnecting conducting plates, rather than being fed to a further high temperature fuel cell.

High temperature fuel cells with a similar structure are further disclosed by German Published, Non-Prosecuted Patent Applications DE 44 06 276 A1, DE 41 32 584 A1, DE 39 35 722 A1, and DE 39 22 673 A1, by German Patent DE 44 00 540 C, and by European Patent Application 05 78 855.

In order to avoid mechanical stresses in the high temperature fuel cell stack, in particular during thermal cycles which unavoidably occur, materials for the interconnecting conducting plates have been developed which have an average coefficient of thermal expansion that approximately coincides with that of the electrolyte sheets. Ceramic materials have been developed in the $LaCrO_3$ system, as well as metallic materials based on Cr. Both materials are expensive to obtain. Due to the large proportion of volume occupied by the interconnecting conducting plates in a high temperature fuel cell stack, the cost of the interconnecting conducting plates is a dominant factor in the total cost of the high temperature fuel cell stack.

SUMMARY OF THE INVENTION

It is accordingly an object of the invention to provide a high temperature fuel cell and a high temperature fuel cell stack composed of such high temperature fuel cells, which overcome the hereinafore-mentioned disadvantages of the heretofore-known devices of this general type and in which material costs for an interconnecting conducting plate are reduced considerably in comparison with those known from the prior art.

With the foregoing and other objects in view there is provided, in accordance with the invention, a high temperature fuel cell, comprising interconnecting conducting plates for leading off current produced in the high temperature fuel cell, at least one of the interconnecting conducting plates formed of an alloy based on Fe with a Cr content of between 17 and 30% by weight and having an average coefficient of thermal expansion of between 13 and $14 \times 10^{-6}/K$ in a temperature range from room temperature to 900° C.; two electrodes disposed between the interconnecting conducting plates and supplied with a working medium by the interconnecting conducting plates, one of the two electrodes having a thickness of at least 100 $\mu$m and the other of the two electrodes having a thickness of about 30 $\mu$m; and an electrolyte disposed between the two electrodes, containing stabilized $ZrO_2$ and having a thickness of between 5 and 30 $\mu$m, the electrolyte and the two electrodes form an electrolyte/electrode element, such has a coefficient of thermal expansion matched to that of the at least one interconnecting conducting plate.

When this alloy is used as a material for the interconnecting conducting plate, the material cost for the interconnecting conducting plate is reduced by a factor of from 10 to 20 in comparison with the materials used in the prior art for the production of interconnecting conducting plates for the high temperature fuel cell.

As mentioned above, one of the two electrodes is at least 100 $\mu$m thick, and the other is about 30 $\mu$m thick. However, a different choice of thickness for the two electrodes increases the stability of the electrolyte/electrode element.

In accordance with another feature of the invention, the electrode provided as the cathode is formed of $LaSrMnO_3$.

In accordance with a further feature of the invention, the electrode provided as the anode is formed of $Ni/ZrO_2$ cermet.

As was also mentioned above, the electrolyte disposed between the two electrodes contains stabilized $ZrO_2$ and has a thickness of between 5 and 30 $\mu$m. The electrolyte/electrode element, which includes the two electrodes and the electrolyte, is thus supported by one of the two electrodes due to its thickness. These electrolyte/electrode elements afford technical advantages. Due to the low electrolyte density, which results in a low electrolyte resistance, it is in particular possible to reduce the operating temperature of the high temperature fuel cell to 750° C. without serious power losses. Advantages in terms of cost also result, since the cost-intensive proportion of electrolyte mass is reduced in comparison with the thicker electrolytes used in the prior art.

In accordance with a concomitant feature of the invention, the electrodes and the electrolyte form an electrolyte/electrode element having an average coefficient of thermal expansion between 13 and $14 \times 10^{-6}$/K.

With the objects of the invention in view there is also provided a high temperature fuel cell stack, comprising a number of such high temperature fuel cells, at least some of the interconnecting conducting plates of the high temperature fuel cells constructed as bipolar plates.

Other features which are considered as characteristic for the invention are set forth in the appended claims.

Although the invention is illustrated and described herein as embodied in a high temperature fuel cell and a high temperature fuel cell stack, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
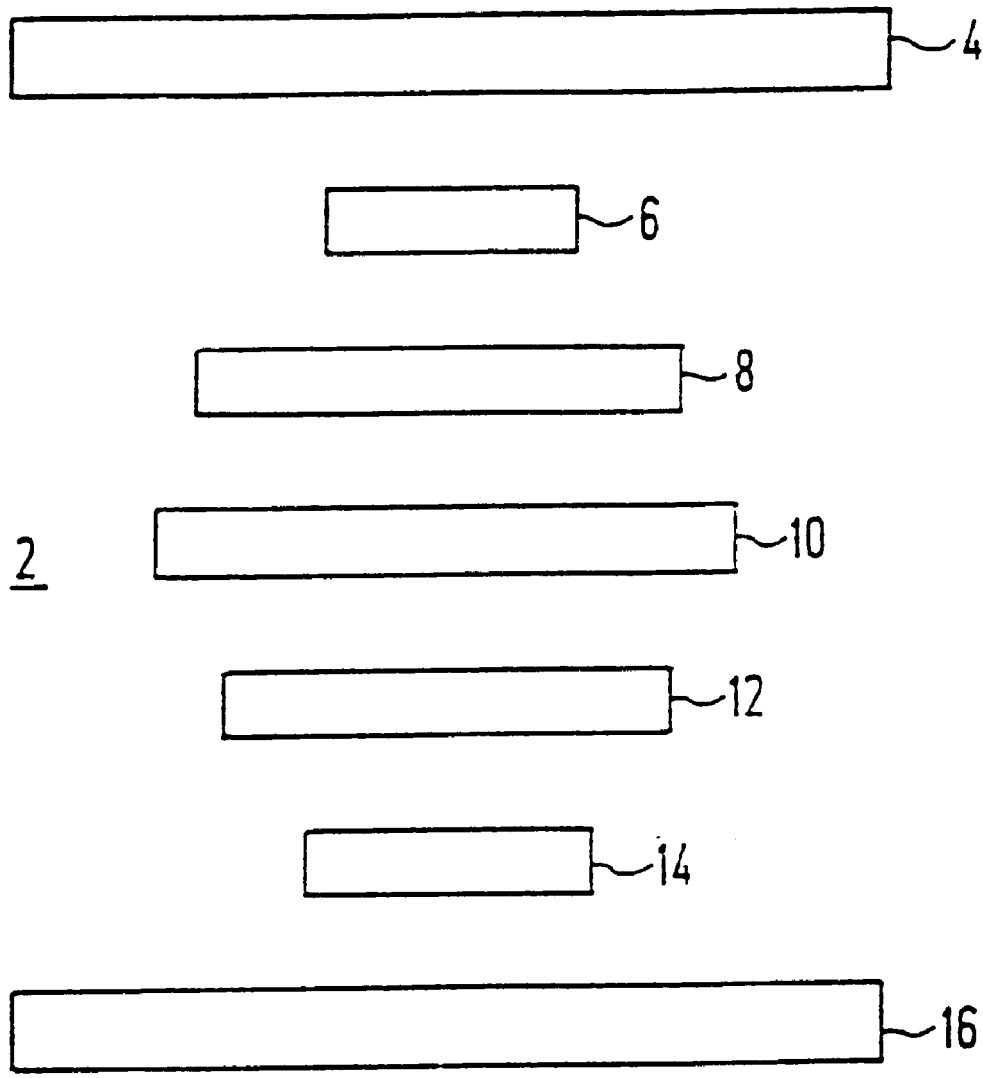
FIG. 1 is a diagrammatic, exploded, cross-sectional view of a high temperature fuel cell.

Referring now to the figures of the drawings in detail and first, particularly, to FIG. 1 thereof, there is seen a high temperature fuel cell 2 which includes an interconnecting conducting plate 4, a contact layer 6, an electrode 8 provided as a cathode, an electrolyte 10, an electrode 12 provided as an anode, a contact layer 14 and a further interconnecting conducting plate 16, which are stacked on one another in that order. The two electrodes 8, 12 and the electrolyte 10 form an electrolyte/electrode element 8, 10, 12.

In this case the interconnecting conducting plates 4, 16 are used as cover plates for the components 6, 8, 10, 12, 14 disposed between them. Current produced in the high temperature fuel cell 2 is led off therefrom through the interconnecting conducting plates 4, 16. Each of the interconnecting conducting plates 4, 16 also supplies a respective one of the cathode 8 and the anode 12 with a working medium.

At least one of the interconnecting conducting plates 4, 16 is formed at least in part, in other words in a subregion, of an alloy based on Fe with a Cr content of between 17 and 30% by weight. Among other things, the contact layers 6, 14 prevent the chromium Cr from evaporating from the interconnecting conducting plates 4, 16.

An average coefficient of thermal expansion of the interconnecting conducting plates 4, 16 in a temperature range from room temperature to 900° C. is from 13 to $14 \times 10^{-6}$/K. The average coefficient of thermal expansion of the interconnecting conducting plates 4, 16 is therefore higher than in the interconnecting conducting plates known from the prior art. Consequently, the assembly which is formed of the components 6, 8, 10, 12, 14 and is disposed between the interconnecting conducting plates 4, 16, has a combination in terms of composition and thickness of the various components 6, 8, 10, 12, 14, which is matched in its average coefficient of thermal expansion to the average coefficient of thermal expansion of the interconnecting conducting plates 4, 16.

For this reason, the electrode 8 provided as the cathode is formed of $LaSrMnO_3$, and the electrode 12 provided as the anode is formed of $Ni/ZrO_2$ cermet. The electrolyte/electrode element 8, 10, 12 therefore likewise has an average coefficient of thermal expansion of from 13 to $14 \times 10^{-6}$/K.

In order to prevent mechanical stresses in the high temperature fuel cell 2, the electrode 8 provided as the cathode is furthermore constructed with a thickness of at least 100 $\mu$m, and the electrode 12 provided as the anode with a thickness of about 30 $\mu$m. It is also possible to reverse the thickness ratio between the anode 12 and the cathode 8. In this embodiment, the electrolyte 10 disposed between the two electrodes 8, 12 is formed of stabilized $ZrO_2$. In this case the electrolyte 10 is constructed with a thickness of between 5 and 30 $\mu$m.

Figure 2:
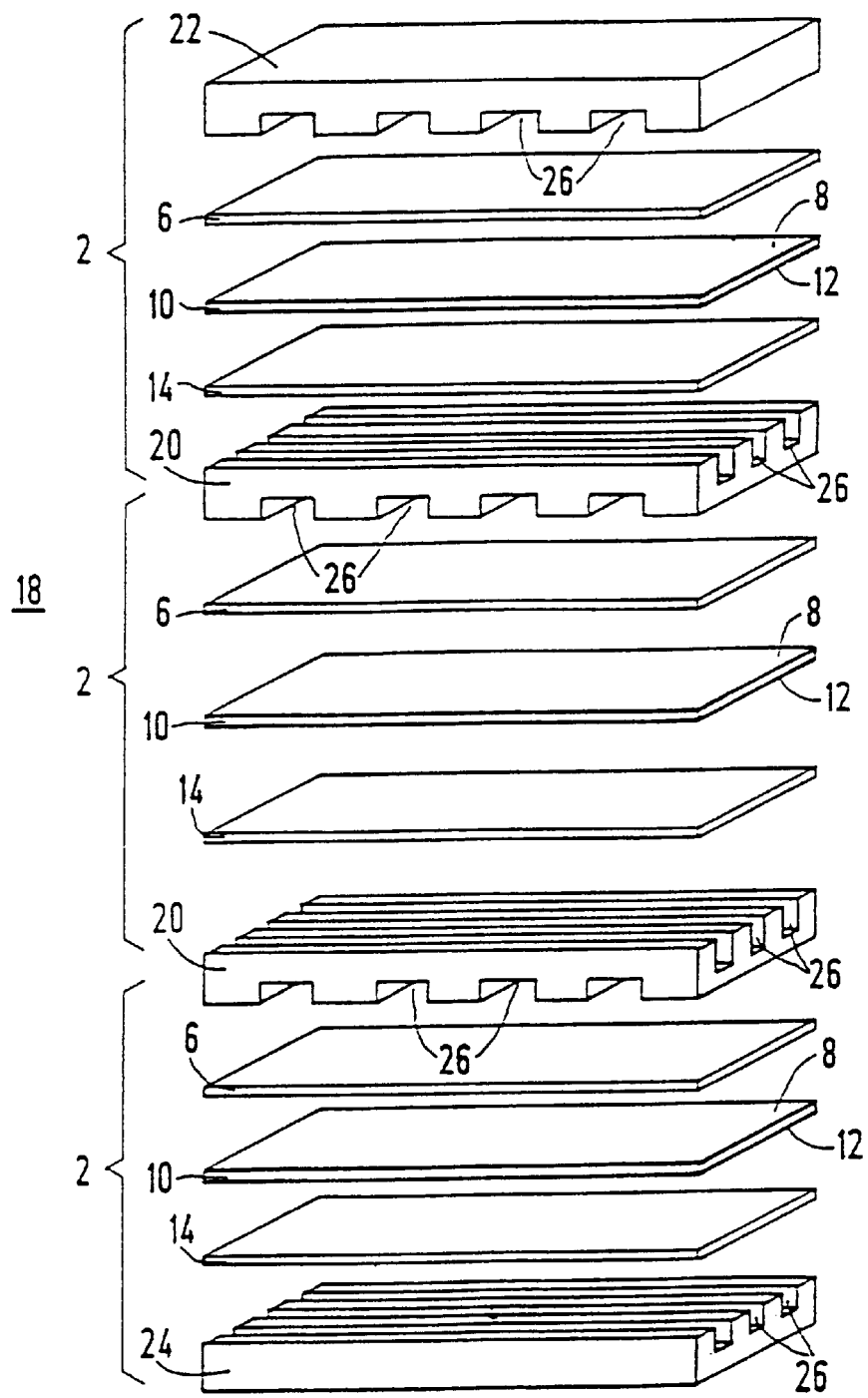
FIG. 2 is an exploded, cross-sectional, perspective view of a high temperature fuel cell stack, which is composed of a large number of high temperature fuel cells.

FIG. 2 shows a cross-section of a diagrammatic structure of a high temperature fuel cell stack 18 which is formed of high temperature fuel cells 2. In the illustrated embodiment, the stack 18 includes three high temperature fuel cells 2, each of which has the same type of structure as the high temperature fuel cell 2 represented in FIG. 1.

The fuel cell stack 18 is closed off at the top with an interconnecting conducting plate 22, and at the bottom with an interconnecting conducting plate 24. In this case, the interconnecting conducting plates 22, 24 take on the function of the interconnecting conducting plates 4, 16 represented in FIG. 1.

The interconnecting conducting plates 20 which are disposed inside the high temperature fuel cell stack 18, that is to say which do not close off the high temperature fuel cell stack 18 in one direction, as the cover plates 22 and 24 do, are constructed as bipolar plates. An upper part of the interconnecting conducting plate 20 is assigned to an electrode 12 provided as the anode, and a lower part of the interconnecting conducting plate 20 is assigned to an electrode 8 provided as the cathode. In this case, the electrode 8 provided as the cathode and the electrode 12 provided as the anode belong to adjacent high temperature fuel cells 2.

The interconnecting conducting plates 20, 22, 24 are each provided with channels 26 which are intended for supplying the high temperature fuel cells 2 with working media. In the case of the interconnecting conducting plates 22, 24, only one side is respectively provided with the channels 26, while the interconnecting conducting plates 20 are provided with the channels 26 on both sides.

Since the high temperature fuel cell stack 18 is generally composed of a large number of high temperature fuel cells 2, a large number of interconnecting conducting plates 20 are correspondingly also present inside the high temperature fuel cell stack 18. If the interconnecting conducting plates 20 according to this embodiment are made of an alloy based on Fe with a Cr content of between 17 and 30% by weight, at least in a subregion, then the cost for the total high temperature fuel cell stack 18 is reduced in comparison with high temperature fuel cell stacks known from the prior art, by at least a factor of 10.

I claim:

1. A high temperature fuel cell, comprising:

interconnecting conducting plates for leading off current produced in the high temperature fuel cell, at least one of said interconnecting conducting plates formed of an alloy based on Fe with a Cr content of between 17 and 30% by weight and having an average coefficient of thermal expansion of between 13 and $14 \times 10^{-6}$/K in a temperature range from room temperature to 900° C.;

two electrodes disposed between said interconnecting conducting plates and supplied with a working medium by said interconnecting conducting plates, one of said two electrodes having a thickness of at least 100 μm and the other of said two electrodes having a thickness of about 30 μm; and an electrolyte disposed between said two electrodes, containing stabilized $ZrO_2$ and having a thickness of between 5 and 30 μm, said electrolyte and said two electrodes forming an electrolyte/electrode element having an average coefficient of thermal expansion of between 13 and $14 \times 10^{-6}$/K thermal expansion matched to the coefficient of thermal expansion of said at least one interconnecting conducting plate.

2. The high temperature fuel cell according to claim 1, wherein one of said electrodes is a cathode formed of $LaSrMnO_3$.

3. The high temperature fuel cell according to claim 1, wherein one of said electrodes is an anode formed of $Ni/ZrO_2$ cermet.

4. The high temperature fuel cell according to claim 2, wherein the other of said electrodes is an anode formed of $Ni/ZrO_2$ cermet.

5. A high temperature fuel cell stack, comprising a plurality of high temperature fuel cells according to claim 1.

* * * * *